United States Patent [19]

Westphalen

[11] 4,241,686
[45] Dec. 30, 1980

[54] FLOATING PASSENGER AUTOMOTIVE VEHICLE AS TOURING AND WATER-SPORTS MOBILE

[76] Inventor: Wilhelm Westphalen, No. 27, Bentwisch, 2171 Oberndorf (Oste), Fed. Rep. of Germany

[21] Appl. No.: 23,053

[22] Filed: Mar. 22, 1979

[51] Int. Cl.³ .............................................. B60F 3/00
[52] U.S. Cl. ...................................... 440/59; 440/111; 440/113; 114/270
[58] Field of Search .............. 115/1 R, 1 A; 180/89.1, 180/233, 247, 248, 249, 250

[56] References Cited

U.S. PATENT DOCUMENTS

| | | | |
|---|---|---|---|
| 3,765,368 | 10/1973 | Asbeck | 115/1 A |
| 3,903,831 | 9/1975 | Bartlett | 115/1 A |
| 3,941,074 | 3/1976 | Millerbernd | 115/1 A |

Primary Examiner—Trygve M. Blix
Assistant Examiner—D. W. Keen
Attorney, Agent, or Firm—John C. Smith, Jr.

[57] ABSTRACT

A floatable passenger car for land and water cruising has a bow portion with an inclined floor, a central portion which with the bow portion forms a gliding boat body and floor and includes a bulkhead at its rear end, and a rear portion, seats being located in the central and rear portions to permit passengers to be selectively seated in the rear portion for maximum water cruising speed. The front and rear wheels are retractable into individual compartments located in the central and rear body portions, respectively, and the compartments for retaining the front wheels include sliding doors covering the openings to the compartments when the front wheels are retracted to reduce resistance during high speed cruising on the water. A propeller shaft with a propeller on the end thereof extends rearwardly from the bulkhead and is pivotable between elevated and lowered positions. The engine is located between the front wheels and is coupled through transmissions to the front wheels and the propeller shaft. Reversible electric motors which may be controlled by switches operated by the driver are arranged to raise and lower the wheels and the propeller shaft.

11 Claims, 18 Drawing Figures

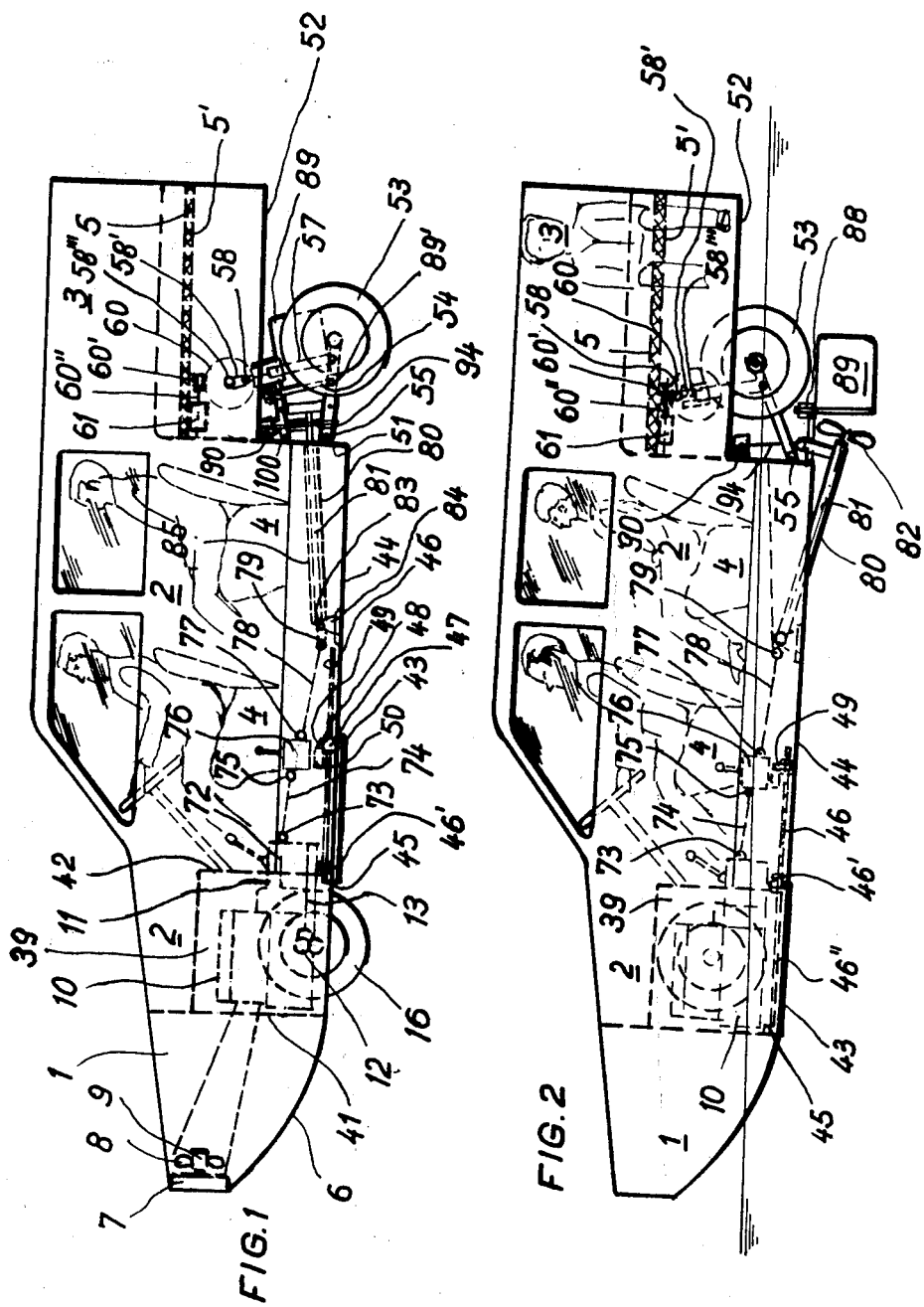

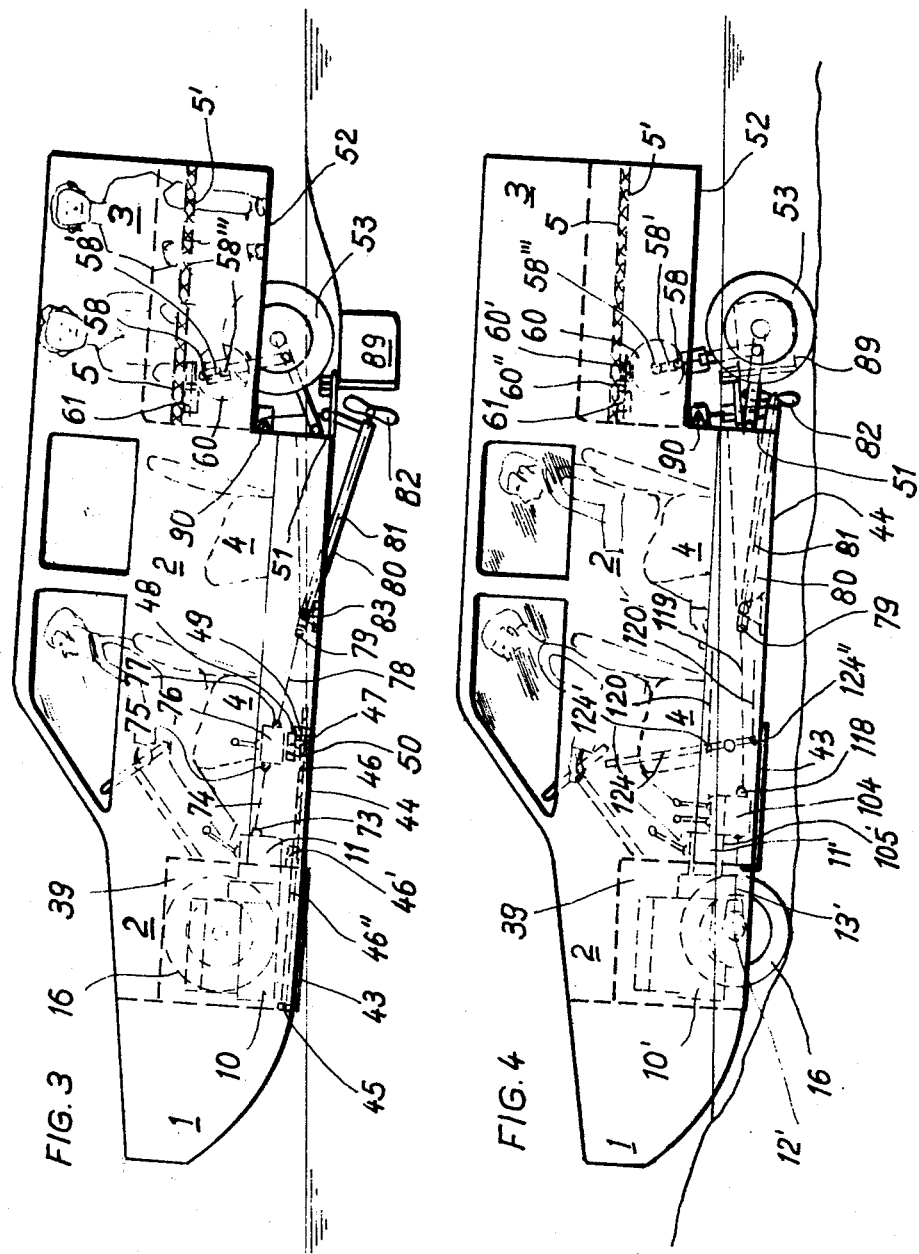

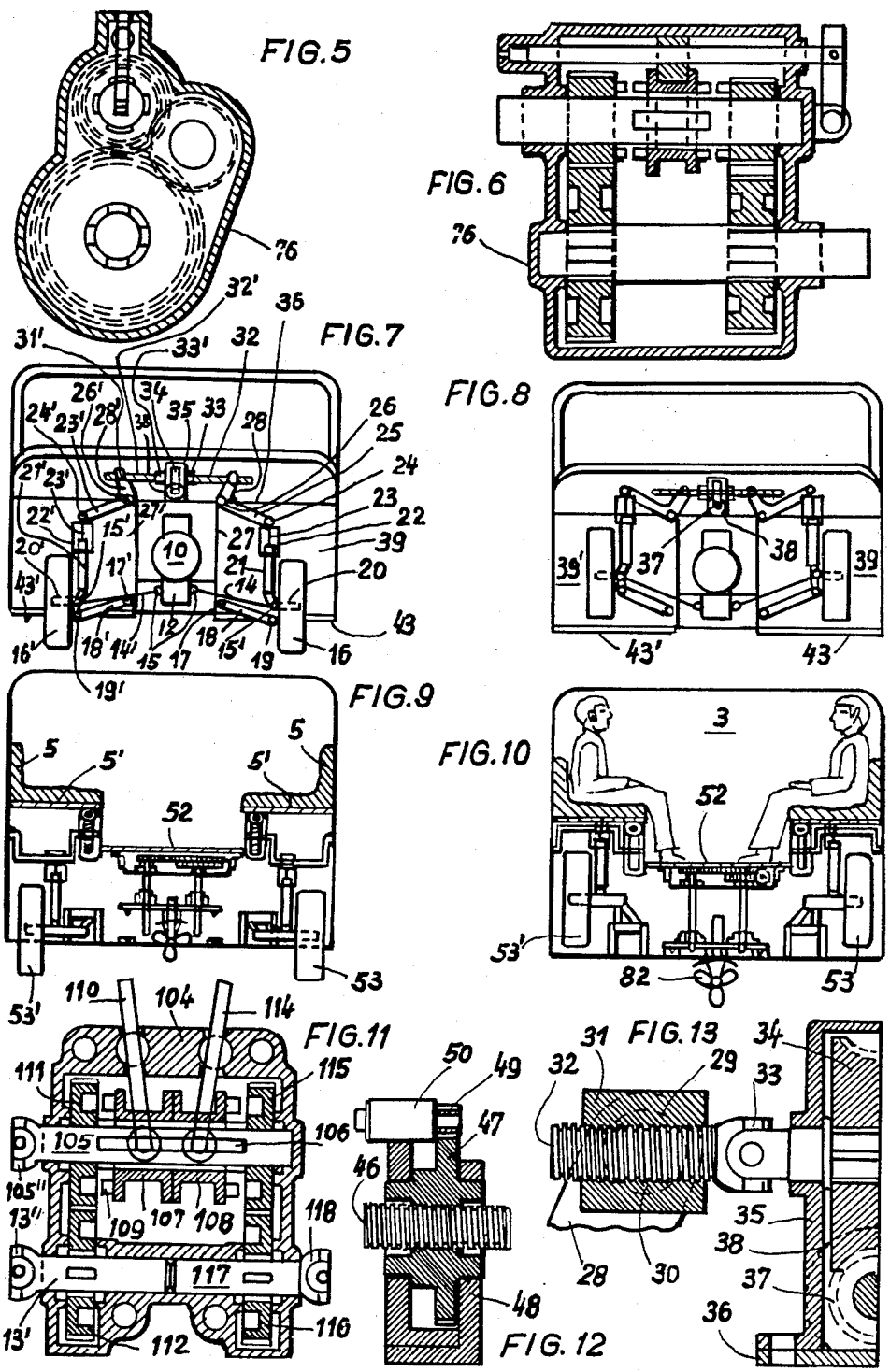

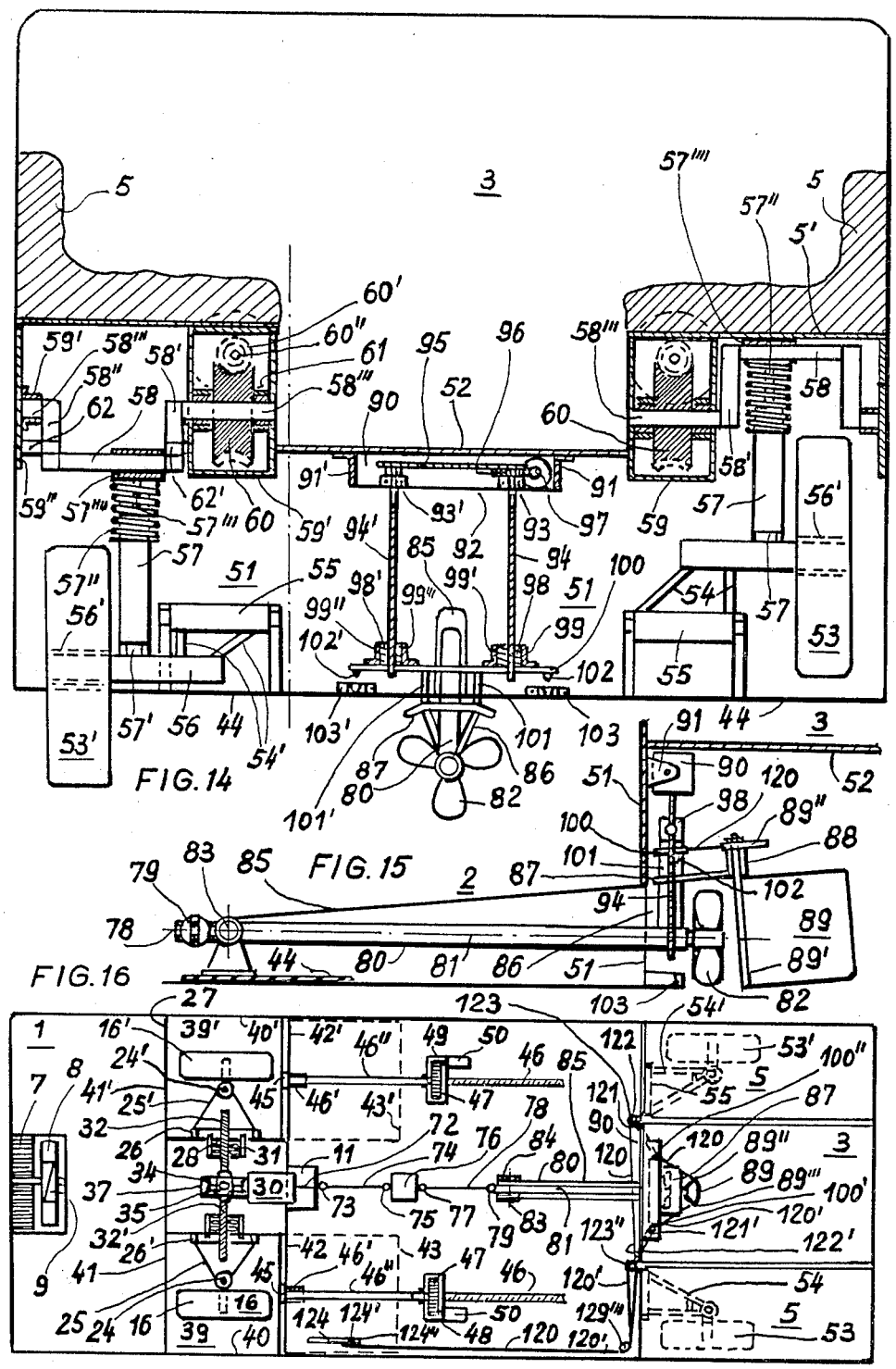

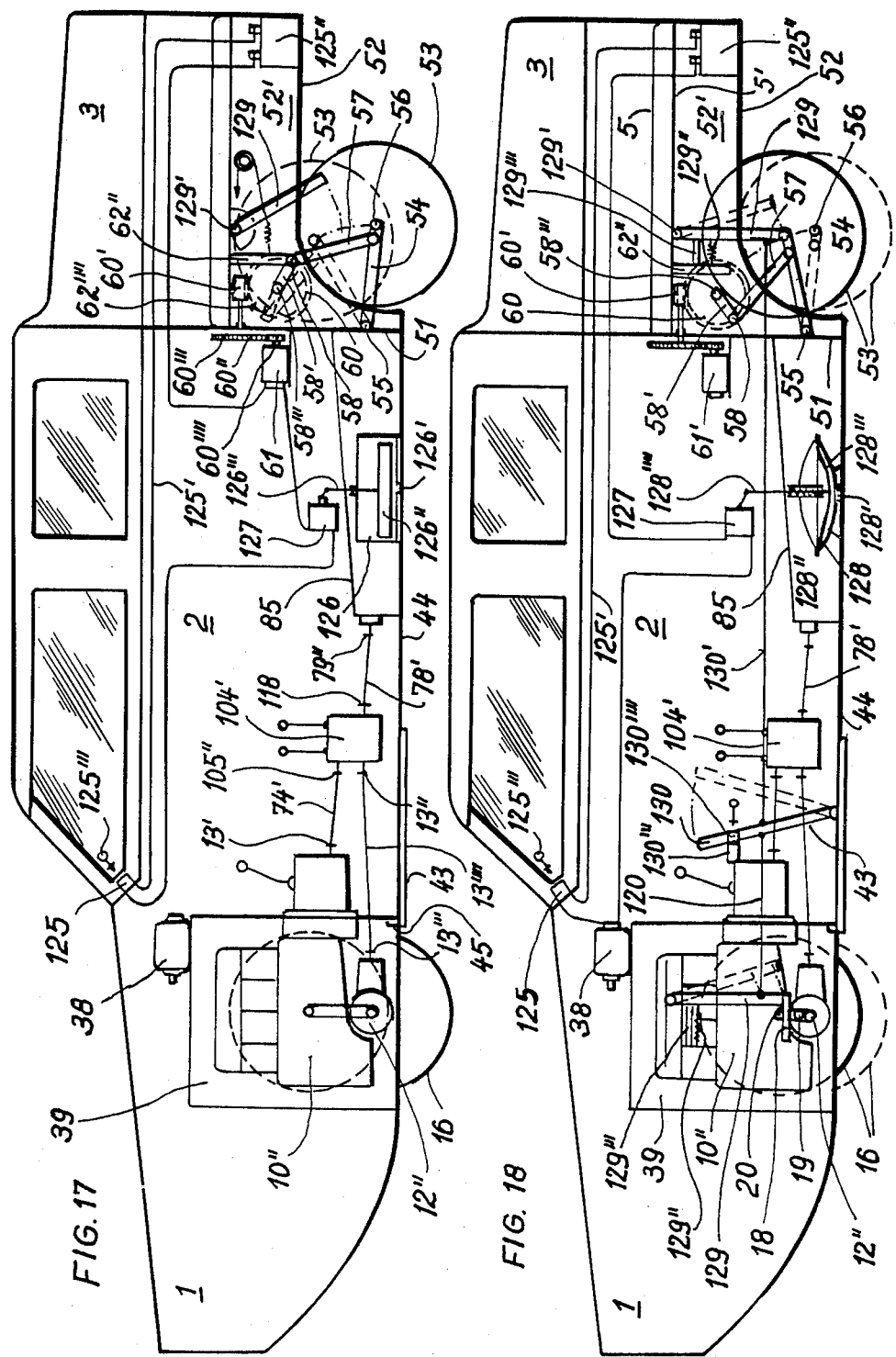

FLOATING PASSENGER AUTOMOTIVE VEHICLE AS TOURING AND WATER-SPORTS MOBILE

BACKGROUND OF THE INVENTION

This invention relates to a floatable passenger automotive vehicle as touring and water-sports mobile which next to the properties of a good passenger automotive vehicle for touring additionally permits the direct cruising on seas and rivers, driven by an automobile motor of moderate power and relatively low fuel consumption, but exhibiting an extraordinarily high speed of more than fifty kilometers per hour when cruising on water, for instance a most rapid pulling of water skiers then being able to be performed.

SUMMARY OF THE INVENTION

Floatable passenger automotive vehicles are known. While the known vehicles of this kind serve their intended purposes within certain inherent limitations, they have several disadvantages. To eliminate said disadvantages it is, therefore, the object of the present invention to provide a floatable passenger automotive vehicle as touring and water-sports mobile which is simple in construction and performs effectively and efficiently the purposes for which it is intended.

The prototype of my passenger car built by me in extensively using economical series-type parts of proven passenger cars and equipped with an additional boat propeller and with car wheels completely retracted into the special-type body for water cruising reaches by a novel gliding capacity as would up to now only be feasible comparatively for special glide boats which then, however, are not able to be driven on land during practical cruising on a private drainage channel, with five passengers on board, for a car having a length of 5.30 m and a width of 2 m and a driving weight of 1,219 kg, driven only by a commercial 73.6 kW automobile engine of the car type VW-K70 of the Volkswagenwerk, the astonishingly high water cruising speed of 56 kilometers per hour not considered to be possible by experts.

In this regard, it was especially surprising for experts that this unusually high water cruising speed of my passenger automotive vehicle land and water cruise mobile was achieved without any special supporting means such as glide wings or air cushions which would be ruled out for passenger cars in public traffic anyhow, apparently only by a special configuration and design of my two meters broad passenger car special-type body. The not possible driving of my prototype at full speed on my private premises on land was estimated by experts to be approximately equivalent to the speeds and accelerations achievable with the same engine in conventional passenger cars, the experts being pleased that the operation of my prototype when driving on land is the same as that with conventional passenger cars and also readily should be in compliance with authority regulations for passenger cars in public traffic.

The novel floatable passenger car with an additional boat propeller for cruising in water is characterized by a passenger car special-type body designed as a generally two meters broad special-type glide board body with front-engine/front-wheel drive for a particularly advantageous climbing out of the car from the water onto shore and with a seat assembly built into the body central portion for three to five car passengers for the use and loading thereof during car road driving and water entry and exit and with a second seat assembly built into the rear body portion elevated by one step and permanently positioned above water during water cruising, on side seat benches there for a particularly effective utilization and loading by the same car passengers for achieving a high-speed glide-boat cruising of the car with this special-type body, wherein the lower body portions, i.e. the front portion and the entire central portion of the passenger car special-type body are designed as a generally two meters broad glide-boat body, rearwardly of the particularly light-weight, about two meters broad body front portion having a lower, inclined, also about two meters broad ramp glide surface than in the adjacent, also about two meters broad body glide boat main portion having a lower, also about two meters broad glide bottom at the front the passenger car front wheel drive engine and at the two sides thereof chute-like front wheel accommodation boxes completely integrated into the body being installed, said boxes being closable after retraction of the car front wheels by at the bottom slidable plate slides, behind the bulkhead positioned forwardly substantially in this special-type body (by about 1.20 meters from the rear end of the passenger car) the water thrust propeller positionable upwardly and downwardly and drivable by the passenger car front engine via an upwardly and downwardly pivotable shaft and at this forwardly positioned bulkhead articulated the upwardly and downwardly positionable car rear wheels being arranged underneath the side seat benches of the freely supported elevated rear body portion, said rear wheels during passenger car water cruising, being retracted into this free space, not causing a water resistance (without for achieving this requiring closable wheel boxes like for the front wheels), on the whole a passenger car special-type body combination which in its cooperation with an economic automotive vehicle engine of only 73.6 kW power by water glide cruising on seas and rivers achieves otherwise not approximately achievable high speeds (in excess of 50 kilometers per hour).

Among further advantages, it is of great importance for the invention that a special safety installation is found which prevents that the complete retraction of the car wheels into the body for high-speed water gliding accidently may also occur during road or terrain driving of the mobile and then the ground could be touched, which is achieved by the invention by means of an installation which during road driving of the car blocks a further pulling up of the car wheels before a ground touching of the body could occur.

DESCRIPTION OF THE PREFERRED EMBODIMENTS

Some preferred embodiments of the invention will now be described by way of example and with reference to the accompanying schematic drawings in which:

FIG. 1 is a longitudinal sectional view of my actually built and practically tested passenger car prototype with front wheel drive by a 73.6 kW car engine of the well-known car type VW-K70 of the Volkswagenwerk in this instance during road driving with downwardly positioned car wheels and boat propeller retracted into the body, all car passengers sitting on the front seat assembly in the central portion of the passenger car special-type body (which is then also maintained upon entry of the passenger car from shore into water and similarly upon exit from the water to shore), driving situations wherein the driven passenger car front wheels are to mainly be loaded;

FIG. 2 is a similar view of the passenger car which has now already entered water, its boat propeller already being positioned downwardly, the car wheels being upwardly moved into the body and the front wheel boxes already being closed by sliding forwardly the plate slides only provided there (for which operations the driver only was required to depress electrical push-buttons in order to have these operations performed by electric drives), by reseating of car passengers which in FIG. 1 during road driving of the car and entry into the water were still sitting on the front seat assembly in the central portion of the body and had there loaded the front wheels of the car more heavily in the elevated rear portion of the special-type body on the side seat benches located there the passenger car thereby already attaining in water a certain inclination rearwardly, thereby the lower edge of the bulkhead far forwardly positioned at the special-type body now being positioned accordingly deeper in water than the front portions of this special-type body;

FIG. 3 is a similar view of the passenger car already in high-speed water gliding, where the elevated rear portion of the passenger car special-type body is loaded most heavily by the car passengers sitting on the side seat benches and only the car driver has stayed on his seat in the central portion;

FIG. 4 is a similar view of the passenger car still in water, but already during pulling out of the water onto shore, for which purpose the car wheels have already been positioned downwardly, the car passengers have now resumed their positions in the central portion of the body and the thrust propeller has now been positioned into a central elevation in which only the lower propeller half is underneath the gliding floor where the thrust propeller when landing is able to support by thrust pushing with generally half power, but a stripping along and shore ground being prevented by the tires of the car wheels positioned at a lower elevation. In the passenger car embodiment outlined in FIG. 4 for instance as a car modification instead of the car engine VW-K70 used in the built prototype outlined in FIGS. 1 to 3 wherein the differential for the front-wheel drive is already built underneath this front-drive engine at the genuine engine now modified an otherwise commercial car engine of the so-called standard car type has been used wherein otherwise the front-engine had driven the rear wheels of the car. Since now for the instant invention a front-wheel drive is a requirement, also for the car modification of FIG. 4 (similarly for a further modification according to FIG. 17 and FIG. 18) a differential for the front-wheel drive has been built in underneath such a standard front engine (in FIGS. 17, 18 a differential 12'' however), which again, however, requires a new additional intermediate transmission (according to FIG. 11) behind the speed-ratio transmission of the standard engine and an intermediate shaft forwardly to this differential, for which modifications in FIG. 11 such an intermediate transmission has been outlined which then also replaces the reversion transmission still used in the built car prototype. Applicant has chosen for his built prototype the embodiment modification according to FIGS. 1 to 3 which an additional reversing transmission, because the latter is produced in mass production as one conventional in motor boats, is able to be purchased ready at a reasonable price and in the VW-K70 engine capable of being used particularly simple the differential already is positioned underneath this engine, the passenger car modification according to FIG. 1 was presently cheaper than passenger car modifications according to FIG. 4 and also to FIG. 17 and FIG. 18, which on the other hand brings about the appreciable advantage that the propeller may also be driven with the further gear ratios of the speed-ratio transmission (11' or 11'' in FIGS. 17, 18), with these passenger car modifications for the same engine power rates the same maximum speeds probably being able to be reached for water gliding, however;

FIGS. 5 and 6 show a cross section and a longitudinal section of a motor boat reversing transmission as used in the passenger car modification according to FIGS. 1 to 3 and there drives the propeller with half of the speed of the front engine reduced;

FIG. 7 shows from the front a vertical cross section of the passenger car in the proximity of the driven front wheels of the car, the car wheels just having been brought into their lowermost position for road driving;

FIG. 8 shows from the front the same passenger car cross section, but with the front wheels of the car retracted into the body, the wheel box plate slides for closing the front wheel boxes already being slid into the closed position underneath the front wheels raised into broad wheel boxes because of steerability of the wheels;

FIG. 9 shows from the rear a vertical cross section of the passenger car in the proximity of the rear wheels of the car when they are extended (according to FIG. 4) for a moving of the car out of the water onto shore, a propeller being in a central position at the level of the lower glide floor;

FIG. 10 shows from the rear a vertical cross section of the rear portion of the passenger car with now fully retracted rear wheels and the propeller brought into the lowermost position for high-speed water gliding generally according to FIG. 3;

FIG. 11 is a longitudinal section of an additional transmission as used for the passenger car modification of FIG. 4 and also for the passenger car modification of FIGS. 17, 18, in which latter case this intermediate transmission may be built into the body a little further rearwardly at the former place of the reversing transmission in the built passenger car prototype;

FIG. 12 is a cross section of a small gear for an electro-motive movement of the plate slides upon opening and closing the box chutes for the front wheels;

FIG. 13 shows in section, on a larger scale, the half of a worm gear drivable by an electric motor with the screw spindle portion and the nut as used in FIGS. 7 and 8 for lifting or lowering the front wheels of the car;

FIG. 14 is a cross section, on a larger scale, of the rear body portion, at the left half of the drawing with the one rear wheel in the lower position, at the right-hand half of the drawing with the rear wheel completely pivoted into the body and in the midportion of the drawing with a particularly advantageous mechanism for a height positioning of the propeller;

FIG. 15 shows in a partial cut-away section of the body of the car from the side the height positioning mechanism of the propeller and the side rudder;

FIG. 16 shows in a view from the top the passenger car in a horizontal longitudinal section at a level closely above the side seat benches in the body rear portion, now with a steering apparatus of the passenger car for water cruising;

FIG. 17 is a side elevational view of a newly planned water-land mobile with the mechanism of an uncomplicated crank-lift- and lower-apparatus of the just still low positioned rear wheels (as illustrated in full lines), which with safety lock levers already pivoted away from the wheel axles for a now possible upward pivoting of the rear wheels may be brought into the upper position of the rear wheels within the body as illustrated in phantom, a positioning of the safety lock levers being outlined in which just all safety lock levers have been disengaged, which, however, is only done by the car driver during that short period of time in which he wishes to completely retract the car wheels into the body with the car already in the water, for high-speed water gliding, and FIG. 18 is a side elevational view of the same water-land mobile with car wheels lowered as illustrated in phantom, for driving on land, wherein the safety lock levers are permanently positioned in a locking position above the wheel axles, it now having been assumed that the switch for the electric motors for moving upwardly the car wheels has been operated by accident or erroneously, but then the car wheels during their slow lifting movement are able to move only so far that their wheel axles strike against the safety lock parts, the car wheels (illustrated in full lines) then still having sufficient ground clearance for driving, per se unprobable cases which are safeguarded by further safety devices additionally.

DESCRIPTION OF THE PREFERRED EMBODIMENTS

The passenger car special-type body shown in FIGS. 1 to 3 and 16 of the built passenger car prototype tested in the field consists of corrosion-resistant light metal, has an overall length of 530 cm and an overall width of 200 cm, with a front portion 1 of 110 cm in length and 200 cm in width, a central portion 2 with a length of 300 cm and a width of 200 cm, and a rear portion 3 at one step higher and having a length of 120 cm and a width of 200 cm.

The body central portion 2 has a front seat assembly 4 for four to five car passengers, which is occupied for car road driving and also when driving into water from the shore and similarly when driving out of water onto shore, in order to thereby well load the driven front wheels of the passenger car. The body rear portion 3 raised by one step has a second seat assembly 5 on two side seat benches 5' which are occupied by the car passengers for high-speed water gliding of the car (FIGS. 3, 10), in order to thereby relieve the front portion 1 and also at the front the central portion 2 of the special-type body for this period of time and to load accordingly more the rear elevated body portion 3.

The front portion 1 has as a floor an inclined, slightly convexly curved lower front gliding surface 6, but is otherwise a space empty and kept as a light-weight as possible, except for an engine water radiator 7 at the bow with electric ventilator 8 the electric motor 9 of which controlled thermostatically automatically switches on and off this ventilator according to the respective coolant temperature.

Adjacent thereto, there is provided the large central portion 2 of the special-type body, which in its front center supports a passenger car front engine 10 (VW-K70) having a power rating of 73.6 kW (in FIG. 4 a different car engine 10' and in FIGS. 17 and 18 also a different car engine 10"), namely in the passenger car prototype the lengthwise arranged VW-K70 four-cylinder engine 10 from the rear speed-change transmission 11 of which the differential 12 already positioned underneath this car engine 10 is driven via an intermediate shaft 13 leading thereto forwardly, said differential 12 again driving the front wheels 16 and 16' of the car via semi-shafts 14 and 14' (FIGS. 7, 8) with two ganged pivots 15 and 15'.

These front wheels 16 and 16' of the car are, as usual for passenger cars with front wheel drive and as outlined in FIGS. 7 and 8 swingable upwardly and downwardly on transverse arms 18 and 18' pivotable upwardly and downwardly about body supports 17 and 17' when the car bounces, the external ends of said transverse arms 18 and 18' supporting from the lower side with usual ball and socket joints 19 and 19' at the bottom of the wheel hub housings 20 and 20' the front wheels steerable for directional changes, while at the top for a further guiding of the front wheels there are secured the generally vertically positioned tubes of spring legs 21 and 21' of the well-known so-called McPherson design to the wheel hub housings 20 and 20'.

The spring leg piston rod 23, 23' surrounded by the spring leg spring 22, 22' is now secured according to FIGS. 7 and 8 to the upper piston rod end for permitting the front wheel low positioning for road driving and high positioning for water cruising (see also FIG. 16) by means of a ball and socket joint 24, 24' to the external end of a new upper transverse arm 25, 25' which in turn arranged above the lower transverse arm 18, 18' generally parallel thereto is supported with its internal end in a bearing 26, 26' guiding it upwardly and downwardly pivotable at the upper edge of one internal wall 27, 27' each of the front wheel chute boxes 39, 39' to be described hereinafter, at which internal wall 27, 27' underneath also already the pivot bearing 17, 17' of the lower transverse arm 18, 18' is supported.

The upper transverse arm 25, 25' now further has upwardly directed elbow levers 28, 28' at the external ends of which in bearing bores 29, 29' (see also FIGS. 13 and 16) there are supported the bearing spigots 30, 30' of a screw nut 31, 31' pivoted therein.

In the two screw nuts 31 and 31' one screw spindle 32, 32' is inserted into the central bore thereof provided with screw spindle threads, said spindles being connected at their internal ends to a universal joint 33, 33' at the axle of a worm gear 34 the casing 35 of which is secured to a horizontal cross beam 36 in the longitudinal central line of the body. The screw spindle 32 has right-hand threads, and the screw spindle 32' has left-hand threads.

When turning the worm gear 34 (FIG. 13) in the worm gear casing 35 by means of the drive worm 37 supported in this casing by an electric motor 38 reversible in its direction of rotation, the two rotated screw spindles 32 and 32' push by their screw threads of a different hand the screw nuts 31 and 31' guided on their thread convolutions outwardly, thereby the elbow levers 25, 28 and 25', 28' being pivoted such that the front wheels 16 and 16' of the car are simultaneously brought into the low front wheel position for driving of the passenger car on roads (FIGS. 1, 4, 7), or by a reversed direction of rotation of the electric motor 38 the front wheels of the car are brought into the upper position completely within the body for a high-speed cruising of the car in water (FIGS. 3, 8).

For accommodating the two front wheels 16 and 16' of the car for water cruising, at both sides of the front engine 10 particularly spacy front wheel boxes 39 and 39' (FIGS. 1 to 4, 7, 8, 16, 17, 18) are integrated into the wide (200 cm) special-type body, each of said boxes being defined in the form of a vertical chute by a part surface 40 and 40' of the external wall of the body, an internal wall 27 or 27' parallel thereto, a front wall 41 or 41' and a rear wall 42 or 42'. These front wheel boxes 39 and 39' are dimensioned so large that the pivotability of the front wheels 16 and 16' is completely maintained when directing the car through turns.

In order to achieve a maximum gliding speed of the passenger car in water, these chute-shaped front wheel boxes 39 and 39' are completely integrated into the special-type body and closable after lifting up the front wheels 16 and 16' of the car into these front wheel box chutes at the lower edges thereof by plate slides 43 and 43' (FIGS. 1 to 4, 7, 8, 16), to this end these plate slides being pushed at their lateral edges in guides externally at a lower gliding floor 44 of the front lower body central portion 2 for a secluding covering of the front wheel boxes forwardly at the car and rearwardly for a complete opening.

As a device easy to be operated from the driver's seat for a respective forward or rearward slide movement of each of the two plate slides 43 and 43', at the front edge thereof a front rod 46" non-rotatable in a small block 45 and extended through a packing box 46' water-proof in the wheel box chute wall 42, 42' (FIG. 16) is secured defining a part of a screw spindle 46 arranged above the internal gliding floor 44 parallel thereto in longitudinal direction of the passenger car, thus in sliding direction of the plate slide 43, 43', said screw spindle 46 passing through a hub of a gear 47 (FIG. 12) provided with the same nut threads, which gear in turn is supported in a gear housing 48 secured on the internal gliding floor 44 and being able to be rotated by a pinion 49 by means of a reversible electric motor 50, the gear 47 depending on its direction of rotation axially displacing the non-rotatable screw spindle 46 and thereby the plate slide 43 through the intermediary of the block 45 thereof.

The 200 cms broad car gliding floor 44 underneath the 300 cm long central portion 2 of the special-type body for achieving maximum water cruising speeds is not extended to the rear end of the car, but terminates in the passenger car prototype 120 cm in front thereof at a vertical bulkhead 51, beginning with this bulkhead placed forwardly in the passenger car the body portion 3 elevated by one step starting, the floor 52 of which is at such a level that it will always be disposed above the water surface.

As outlined in FIGS. 9, 10 and 14, underneath each of the two side seat benches 5' one rear wheel 53 or 53' is accommodated in this body portion 3 along with the specific apparatus thereof for lifting and lowering, since it has proven to be advantageous in the structure of the versatilely usable mobile to provide in this body portion 3 for each rear wheel an own lifting and lowering device with a specific electric drive motor, as auxiliary means for the actual lifting and lowering of the rear wheels a simple crank drive or crankshaft being employed.

Each of the two rear wheels 53 and 53' is mounted individually (FIGS. 9, 10, 14, 16) like otherwise also known for passenger cars on one longitudinal arm 54, 54' or inclined arm each which is mounted upwardly and downwardly pivotable and thus swingable above the rear wheel spring leg with a generally horizontal bearing axis 55, but here at the vertical bulkhead 51 in the vicinity of the lower edge thereof.

A spring leg 57 with a lower bearing 57' is articulated to each of these longitudinal arms 54 and 54' (FIG. 14) at the rear axle trunnion 56 in the vicinity of the rear wheel hub 56' in a generally upright position.

The upper end of the spring leg piston rod 57''' surrounded by the spring leg helical spring 57'' now carries a novel, special bearing 57'''' which like a connecting rod bearing is screwed together of two half-cylinder shells and now encompasses the crank pin 58 of the crankshaft provided in this instance which with the stroke of its crank arms 58' and 58'' during their generally semi-circular forward or rearward pivot movement has to effect the actual lowering and lifting.

This crank shaft for a particularly stable attachment to the light-weight body sheet parts is supported at both ends underneath the respective seat bench 5'.

The crankshaft main axle 58''' at the one crankshaft arm 58' is mounted in a casing 59 bolted underneath the respective seat bench 5' and carries in the casing interior a worm gear 60 keyed thereto which is able to be driven by a worm 60' now likewise mounted lengthwise in this casing 59 with a suitable reduction, either by a more powerful electric motor 61 directly on the worm axle 60'' as illustrated in FIG. 4 and in the semi-diagrammatic illustrations of FIGS. 1 to 4, 9 and 10 or in a two-step reduction as outlined in FIGS. 17 and 18 with a large gear 60''' keyed upon the worm axle 60'', said gear 60''' then being driven by a pinion 60'''' via a several times smaller electric motor 61', respectively with a right-hand or left-hand rotation, depending on whether a lifting or lowering of the rear wheels is to be effected.

For a mounting of the rear wheel crankshaft at both ends, the second crank arm 58'' thereof (FIG. 14) further has an axle trunnion 58'''' which is mounted in the bearing bush 59' of a flange 59'' bolted to the body. The generally semi-circular pivot movement of the two crank arms 58' and 58'' of this crankshaft is stopped upon lowering the rear wheels 53 and 53' toward the end of water cruising in the low position also required for road driving by stops 62 and 62' stationary at the body, as outlined in FIG. 4, or by support parts such as lock supports 62'' stationary at the body as outlined in FIGS. 17 and 18, acting as limitations and securers, in FIG. 17 by a second stop 62''' in both directions of rotation of the crank. For a further securing of the low positioning of the car rear wheels during road and cross-country driving, these limit stops 62 and 62' (FIG. 14) or 62'' (FIGS. 17, 18) are now arranged in the pivot circle range of the crankshaft arms 58' and 58'' such that they stop the crank arms 58' and 58'' only when the crank pin 58 has already exceeded the lower deadcenter by a certain distance, i.e. is already slightly in upward movement again, thereby now the retrograde thrust of the rear wheel itself insuring that the crank pin 58 is not able to move retrograde again itself, a movement which is also per se already obstructed by the self-locking feature in the worm gear drive.

This securing of the low positioning (FIG. 14, left-hand portion and FIG. 17) of the rear wheels of the car for road driving by itself brings about a further advantage, namely, as will be particularly noted when viewing FIG. 17, that then a loading of the worm gear hardly occurs during long-time road driving, for the retrograde thrust forces of the rear wheels via the spring legs thereof are received for the major part, even predominantly by the support parts 62 and 62' in FIG. 4 and the support 62" in FIG. 17 stationary at the body.

The lifting and lowering device for each of the rear wheels 53 and 53' is not to be seen from externally behind the bulkhead 51 underneath the side seat benches 5' in the elevated rear body portion 3 by the rear body external wall sheets 52', as illustrated by FIGS. 17 and 18, which for a good accessibility for a tire replacement also provide for aesthetical and well-functioning dirt collectors for road driving and have no covering at the bottom.

In building the passenger car prototype according to FIGS. 1 to 3 and 16, the drive power of the 73.6 kW automobile engine VW-K70 was taken from the shaft 72 (FIGS. 1 and 16) of its change-over transmission 11 and passed through the intermediary of a universal joint 73, a shaft 74 and a further universal joint 75 to a boat reversion transmission 76 (FIGS. 5 and 6), which in a conventional manner permits a forward and rearward driving and reduces the speed of revolution of its countershaft to half the speed of revolution of the engine.

From the countershaft of the reversing transmission, the shaft string passes via a universal joint 77, an intermediate shaft 78 and a universal joint 79 to the front end of the propeller shaft 81 projecting from the tube end of the propeller shaft support tube 80, at the rear end of which propeller shaft now already behind the bulkhead 51 at the end of the gliding floor 44 of the body central portion 2 the propeller 82 is positioned far in front of the rear end of the passenger car.

The propeller shaft support tube 80 is pivotable upwardly and downwardly shortly behind its start behind the universal joint 79 in the vertical longitudinal central plane of the passenger car about a horizontal transverse axle 83 (FIGS. 1 to 4, 15 and 16) in a wide bearing block 84 along with the propeller shaft 81 contained therein and the propeller 82 located at the rear end thereof and beginning with the bearing block 84 in a narrow elongated acuate shaft chute 85 which beginning with the bearing block 84 opens downwardly to the water, therefore permitting the propeller shaft support tube 80 with the bearing block 84 as pivot axis to immerge inclined into the water underneath the gliding floor 44.

The narrow shaft chute 85 also passes rearwardly through the bulkhead 51 (FIGS. 10 and 14) in a narrow recess so that the propeller shaft support tube 80 along with the propeller 82 may be lifted upwardly also into the free space behind the bulkhead 51 underneath the floor 52 of the elevated rear body portion 3 (FIGS. 1, 15). At the rear end of the propeller shaft support tube 80 at the top the conventional caveation plate 87 covering the propeller 82 is arranged which is positioned in two generally vertical rails 86 offering little resistance to water during water cruising, the rudder 89 being supported with its bearing 88 at the rear of said caveation plate (FIGS. 2, 15 and 16).

For pivoting up and down the propeller shaft support tube 80 along with the propeller 82 and the control rudder 89 about the horizontal axle 83 of the bearing block 84 for road driving in the upper position or for water cruising of the car in the lower position and in any intermediate position (FIGS. 4, 9), a particularly convenient lift and lowering device (FIGS. 14, 15 and 16) to be operated remotely by the car driver is provided the upper parts of which are located in a sheet-metal housing 90 which by means of rotary spigots is mounted slightly tiltable at both ends in small bearing blocks 91 and 91' at the upper bulkhead 51 or there at the bottom side of the floor 52 of the body portion 3. In this sheet-metal housing 90 suspended horizontally in the bearing blocks 91 and 91' behind the upper bulkhead at the lower plate 92 thereof in one ball bearing 93, 93' each at the upper end there are mounted two vertically and relatively parallel downwardly suspended screw spindles 94 and 94' which at the top may be driven in the housing 90 with a roller chain 95 connecting them and coupling them in unison via a small worm gear 96 by a reversible electric motor 97.

On the threads of these two parallel screw spindles 94 and 94' there is now located on the same level one threaded nut 98, 98' each of polyamide, which carry at lateral bearing spigots with small bearing blocks 99, 99' and 99", 99'" a common horizontal transverse rail 100 which itself is connected by means of two lower vertical support rails 101 and 101' to the top side of the caveation plate 87 above the propeller 82.

The entire arrangement of the screw spindles 94 and 94' and the threaded nuts 98 and 98' moved by them along with the horizontal transverse rail 100 carried by them and the caveation plate 87 connected thereto, the control rudder 89 and the propeller 82 is codetermined by the concurrent circular pivot movement of all these parts with the propeller shaft support tube 80 about the front horizontal pivot axle 83 thereof in the shaft chute 85 in the vertical longitudinal center plane of the passenger car, the horizontal transverse rail 100 along with all parts 101, 87 and 82 rigidly connected thereto upon the joint rotation of the two screw spindles 94 and 94' also performing a movement on the cylindrical surfaces about the horizontal pivot axle 83 of the propeller shaft support tube 80.

For a secure arresting of the propeller 82 at the long propeller shaft support tube 80 for the particularly high stressing as a result of lateral thrusts on the control rudder for high-speed curves, the transverse rail 100 carries on its bottom side in the vicinity of the two outer edges one tapered strong locating pin 102, 102' each which upon pivoting down (FIG. 14, 15) the transverse rail into the lower position of the propeller engage hookingly in correspondingly hollow tapered sturdy bushes 103 and 103' which are secured at the bulkhead 51 at the bottom and by this additional terminal connection to the rigid bulkhead 51 gave particular support to the propeller 82 and the control rudder 89 also laterally.

When using (FIG. 4) a standard automobile engine 10' (instead of the engine 10 of the type VW-K70 of the prototype) for driving the passenger car with the attached conventional four-gear transmission 11' with reverse, in which case (FIG. 4) then also a differential 12' underneath the engine 10' and a connecting shaft 13' are to be provided, to advantage an additional transmission 104 according to FIG. 11 may be used the input shaft 105 of which may define the direct continuation of the output shaft 105' of the engine change-over transmission 11'.

The shaft 105 of such an intermediate transmission 104 outlined in FIG. 11 carries on its midportion provided with longitudinal keys 106 two dog clutches 107 and 108, of which the one dog clutch 107, provided with flight pins 109 and axially shifted by its operating lever 110, is able to be coupled to a gear 111 loosely arranged on the start of the shaft 105, which gear then via a meshing intermediate gear 112 drives the shaft 13' extensible up to the front differential 12' and thus the front wheels of the passenger car.

To the other dog clutch 108, provided with flight pins 113, by means of its operating lever 114 axially shifted, a gear 115 loosely arranged on the other end of the shaft 105 may be coupled which then via an intermediate gear 116 meshing therewith drives the shaft 117 thereof which now via a universal joint 118 and an intermediate shaft 119 is able to directly drive the universal joint 79 at the start of the propeller shaft 81.

Instead of directly adjoining, as outlined in FIG. 4, the additional transmission casing 104 of FIG. 11 to the casing of the change-over transmission 11' of a standard automobile engine 10' with the shaft 13', it has found to be convenient when using a different standard automobile engine 10" (FIGS. 17, 18) to arrange the additional transmission casing 104 outlined in FIG. 11 in a certain distance to a change-over transmission 11" (FIGS. 17, 18) in the body a little further rearwardly now as an intermediate transmission 104' at the location of the reversing transmission 76 still used in the built prototype (FIGS. 1 to 3) and to connect it via a universal joint 73', a shaft 74' and a universal joint 105' to the change-over transmission 11", in this embodiment (FIGS. 17, 18) at the additional transmission 104' (FIG. 11) further universal joints 105" and 13" and at the differential 12' (FIGS. 17, 18) a universal joint 13''' and for transmitting the engine power for the respective driving of the front wheels of the car and/or for driving the propeller further shafts 13'''' and 78' and joints 118 and 79 being able to be used.

For steering the passenger car upon cruising in water, for turning the control rudder 89 at the control rudder axle 89' mounted rotatable in the bearing 88 (FIGS. 15, 16) at the caveation plate 87 at the top pivot arms 89" and 89''' are arranged at the ends of which one steel cable 120, 120' each is engaged which then, beginning with cable shoes 100' and 100" provided at the external ends of the transverse rail 100 guided in elongated flexible Bowden drive conduits 121 and 121' extending to apertures 122 and 122' in the bulkhead 51 and there along the inner walls of the body central portion 2, are each articulated to one of two arms 124' and 124" of a two-armed lever 124 (FIG. 4), which is conveniently operable from the driver's seat for a manipulation by the left hand of the driver during water cruising completely independent of the usual steering of the passenger car during road driving.

The novel sporting land-water cruisemobile outlined in a side elevational view and in a partial sectional view in FIGS. 17 and 18 next to cruising so-to-say across land and sea is particularly also provided for water sporting, and to this end the rear passenger car body portion 3 is designed as cockpit open at the top, from where among other things water skiers may conveniently be hauled or launch, said cockpit, however, as not outlined, provided with a collapsible roof, at times also being able to be provided with a roof. There are further provided specific devices for special vehicle safety which next to other advantages eliminate an otherwise potential danger that during land driving of the mobile by an accidental operation of switches shifting motors 38, 61 and 50 are put into operation and thereby for instance the car wheels are retracted into the body.

The first most simple safety device to avoid an accidental operation of switches for the shifting electric motors is that these switches 125 in the leads 125' of the current of the car accumulator battery 125" are only able to be operated by means of a key 125'''.

A second device much more extensive in its protective effect which renders impossible the accidental operation of the shifting electric motors during road driving of the passenger car utilizes the circumstances specific to the instant passenger car that the shifting electric motors actually are only needed for a powering action when the car is in the water of a sea or a river, thereby an absolutely reliable solution of this problem being able to be practically achieved, namely that in the power leads to the shifting electric motors means are provided which only permit a current flow to the shifting electric motors upon being subjected to the action of water.

As means for this purpose, as outlined in FIG. 17, in the passenger car at its inner floor 44 a vessel 126 is provided having a short length of pipe 126' leading to the water underneath the gliding floor 44 of the car body which vessel contains a float 126" which automatically closes an intermediate switch 127 (toggle switch) open during road driving of the car in the leads from the battery 125" to the shifting electric motors 38, 61 and 50 when the car has entered the water of a sea or a river and then water has entered the float vessel 126 which then lifts the thereby buoyant float 126" and by the buoyancy closes via a float rod 126''' the intermediate switch 127 open up to now, so that then upon operation of the switch 125 the shifting electric motors (in FIG. 17 only one shifting motor 61 outlined for a rear wheel 53) are put into operation, whereas on the other hand the intermediate switch 127 is automatically reopened when the passenger car has left the water again and the water flows out of the float vessel 126 and the lowered float interrupts the intermediate switch again as a result of its weight.

For the same purpose instead of a float in the embodiment of FIG. 18 a pressure capsule 128 is installed at the gliding floor 44 of the body of the car and provided with a supply passage 128' through the floor 44 of the body the diaphragm 128''' of which loaded by a spring 128" is then lifted as soon as the car has been driven into water, since by the entry of sea water underneath the diaphragm 128'''' of the pressure capsule by the water pressure the diaphragm 128''' is lifted, the spring 128" is stressed and now closes with a diaphragm rod 128'''' the intermediate switch 127 interrupted during road driving of the car so that the electric motor 38 for a front wheel positioning connected as outlined in FIG. 18 could be put into operation by means of the switch 125, whereas on the other hand the intermediate switch 127 (FIG. 18) is interrupted again as soon as the passenger car has been driven out of the water again and the water flows out of the pressure capsule 128, then by the biased diaphragm spring 128" the diaphragm 128''' is urged downwardly again, the diaphragm rod 128'''' interrupting the intermediate switch 127 for the entire time of road driving of the car, on the whole an absolutely reliable safety measure of the water-land mobile.

In the instant land-water cruisemobile, there is additionally installed, as outlined semi-diagrammatically in FIG. 18, a mechanical safety device which during road driving of the passenger car is permanently in safeguarding operation by lock supports 129 then permanently pivoted inwardly with their lower ends into the lifting range of the rear wheel axle trunnions 56 and the lower transverse arms 18 of the car front wheels (drawn in full lines in FIG. 18), which lock supports are supported with their upper ends suspended generally vertical at a bearing 129' stationary at the body, permitting a lifting of the four car wheels 16, 16', 53 and 53' at the body only to such an extent that upon abutment with these lock supports the car wheels still have a residual ground clearance sufficient for the driving of the car, thereby a touching of ground by the car floor not being able to occur.

These limitation supports 129 of the car wheel lift relative to the floor 44 of the car body are urged by one spring 129'' each against abutments 129''' rigid with the body during the entire driving on land.

For only prior to beginning with high-speed water cruising of the passenger car already driven into water these car wheel lift limitation supports 128 are laterally pivoted out of their locking positions (as shown in phantom in FIG. 18) by a lever 130 of the driver via a linkage 130' during the short time in which the car driver completely retracts the car wheels into the body by an operation of the switches 125 with the then operated shifting electric motors 38 and 61. So that the shifting lever 130 is not able to move during road driving of the passenger car, it is permanently urged by a spring 130'' against an abutment 130''' rigid with the body.

This lever abutment 130''' is additionally also provided with a lock 130'''' for a locking for extended land driving of the mobile.

The invention may be embodied in other specific forms without departing from the spirit or the essential characteristics thereof. The embodiments are therefore to be considered in all respects as illustrative and not restrictive.

What is claimed is:

1. A floatable passenger car for land and water cruising as touring and water sporting mobile and having an automobile engine which during water cruising is able to drive a boat propeller, comprising
   (a) a special-type body of three sectional portions (1,2,3), namely
      a first hollow light-weight front-structure bow portion (1) with a forwardly upwardly inclined wide floor (6),
      a second body central portion (2) arranged adjacent to the front-structure bow portion and defining together with the same a gliding boat body with a gliding floor (44), said central portion including a bulkhead (51) at its rear end, seats for a driver and at least three persons which are to be occupied by these persons during road driving as well as when entering water as well as when leaving water, an automobile engine (10, 10', 10'') provided in the front part of said central portion in the longitudinal center thereof, drivable car front wheels (16,16') arranged to be moved up and down at both sides of the engine for the driver selectible driving of the front wheels via special-type change-over transmissions (11,104,104') and/or an up and down positionable propeller (82) placed behind the bulkhead (51) at the rear end of said central portion, i.e. ahead of the overall end of the body, and non-driven car rear wheels (53,53') articulated positionable up and down at said bulkhead, said rear wheels for maximum speed water glide cruising of the car, pulled up, not causing any water resistance without for doing so requiring installation boxes closable by covers, and
      a third rear body portion which has a floor (52) and two side seat benches (5') and is arranged elevated by one step relative to the central portion (2) and during water cruising of the car permanently is located along with its floor above water and for doing so for maximum speed water glide cruising has its two side seat benches occupied with the same persons from the body central portion, by this human weight displacement the car being given a prevailing rear load for an advantageous maximum speed water glide cruising, said non-driven car rear wheels being accommodated in the most simple way underneath two side seat benches of the third rear body portion,
   (b) chute-shaped body installation boxes (39) arranged in the central portion at both sides of the engine for accommodating the front wheels also pulled up during high-speed water glide cruising, said boxes being provided at their lower edges in a corresponding cutout in the gliding floor of the central portion and, after a complete insertion of the front wheels, are closable by plate slides shiftable forwardly underneath the gliding floor for the duration of high-speed water glide cruising of the car;
   (c) a car accumulator battery (125'') arranged in the special-type body, and
   (d) small reversible electric motors (38,61,61',97,50) and switches (125) electrically connected to the accumulator battery, the respective upward and downward positioning of the front wheels and the rear wheels and the propeller as well as the respective shifting of the plate slides underneath the front wheel installation boxes being accomplished by the small reversible electric motors powered by the car accumulator battery, controlled by means of respectively operated switches (125) by the driver from his seat.

2. A floatable passenger car for land and water cruising as set forth in claim 1, wherein for accommodating the two car front wheels for water glide cruising the special-type body is widely dimensioned and has installed at both sides of the automobile engine particularly spacy front wheel boxes (39,39') which are each defined in the form of a vertical chute by a partial surface (40,40') of the body external wall, an internal wall (27,27') parallel thereto, a front wall (41,41') and a rear wall (42,42'), after pulling in of the car front wheels (16,16') into said front wheel boxes for water glide cruising the lower edges thereof in cutouts in the front part of the gliding floor (44) of the body central portion being closable by plate slides (43,43'), said plate slides at their lateral edges being shiftable forwardly in guides externally at the lower gliding floor for coveringly closing the front wheel boxes at the car and rearwardly for fully opening thereof, said shifting being performable by a front rod (46'') secured non-rotatable at a small block (45) at the front edge of the respective plate slide and passing through a packing box (46') in the front wheel box rear wall (42,42') water-proof, said front rod being part of a screw spindle (46) arranged above the inner gliding floor in shifting direction of the plate slide, said screw spindle, itself being non-rotatable, extending through a hub of a gear (47) provided with the same screw nut threads, said gear in turn being mounted in a gear housing (48) secured on the inner gliding floor and being rotatable by means of a pinion (49) of a reversible electric motor (50), said gear (47) depending on its direction of rotation shifting axially forwardly or rearwardly the non-rotatable screw spindle (46) and thereby the plate slide via the block (45) thereof.

3. A floatable passenger car for land and water cruising as set forth in claim 2, wherein the car front wheels (16,16') for a high and low positioning are mounted at the lower part of the internal wheel box side walls (27,27') with transverse arms (18,18') pivotable upwardly and downwardly about bearings (17,17') and with ball and socket joints (19,19') at the lower inner side of wheel hub housings (20,20'), while at the top at the wheel hub housing one upright spring leg (21,21') each is arranged the piston rod (23,23') of which at its upper end is secured with ball and socket joints (24,24') to the external end of a second upper transverse arm (25,25') which itself is mounted above the lower transverse arm (18,18') parallel thereto with its inner end in a bearing (26,26') guiding it pivotable upwardly and downwardly at the upper edge of the internal walls (27,27') of the front wheel chute boxes (39,39'), said upper transverse arm (25,25') further having upwardly directed elbow levers (28,28') at the external ends of which in bearing bores (29,29') there are mounted the bearing spigots (30,30') each of one screw nut (31,31') pivotable therein, into the central bore of which screw provided with screw spindle internal threads one screw spindle (32,32') each is inserted which at its internal end is connected by a universal joint (33,33') to the axle of a worm gear (34), the casing (35) of which is secured on a horizontal cross beam (36) in the longitudinal center line of the body, the one screw spindle (32) having right-handed threads and the other screw spindle (32') having left-handed threads so that upon rotation of the worm gear (34) in the casing (35) by means of the drive worm (37) mounted in said casing and driven by an electric motor (38) reversible in its direction of rotation the two rotated screw spindles (32,32') by their threads of different hands shift the nuts (31,31') guided on their thread convolutions outwardly, the elbow levers (25,28 and 25',28') thereby being pivoted such that the car front wheels concurrently are moved into the low front wheel position, or when the electric motor (38) is operated in a reversed direction of rotation, the car front wheels are lifted into the upper position.

4. A floatable passenger car for land and water cruising as set forth in claim 1, wherein for mounting, lifting and lowering the car rear wheels (53,53') each rear wheel is spring-biased for itself and is provided with a special lifting and lowering device, each rear wheel being mounted pivotable upwardly and downwardly at the forwardly positioned bulkhead (51) in the vicinity of the lower edge thereof about a wide bearing (55) by means of a lengthwise or inclined arm (54) and supported upwardly by a spring leg (57) articulated to its wheel axle trunnion (56), the piston rod (57''') of said spring leg encompassing with a two-shell bearing (57'''') attached at the upper end thereof the crank pin (58) of a crankshaft supported at both ends underneath the one seat bench respectively associated with this car side, of the rear body portion, said crankshaft with an only about semicircular forward or rearward pivoting with the respective upward or downward stroke of its crankshaft arms, said stroke being limited by stops (62,62') or lock supports (62'') at the body, being limited and secured in particular for the low position of the rear wheels for land driving, causing the respective lifting or lowering of the respective spring leg and thus of the associated rear wheel, which crankshaft is rotated at its internal crankshaft axle by a worm gear (60) which is driven with reduction by a driving worm (60'), said parts all being mounted in a casing (59) bolted underneath the seat bench (5') and either being driven by a higher-power reversible electric motor (61) or in a two-step reduction by a large gear (60''') keyed onto the axle of the driving worm (60''), said gear being driven via a pinion (60'''') by a then accordingly lower-power reversible electric motor (61').

5. A floatable passenger car for land and water cruising as set forth in claim 4, wherein for a particularly extensive safeguarding of the low position of the car rear wheels during road and cross-country driving the lock support (62'') is arranged in the pivot range of the crankshaft arms (58',58'') such that the crank arms are only stopped by the end abutments when the crank pin (58) has exceeded the lower deadcenter by a distance already, i.e. is already on the way to perform an upward movement again, thereby by being stopped by the lock support (62'') the backthrust of the rear wheel loading insures with particular advantage that the crank pin (58) does not move retrograde, thereby also a broad unloading of the worm-worm gear drive occurring during the further duration of car land driving, since a large part of the forces is transmitted by the lock support (62'') directly to the body.

6. A floatable passenger car for land and water cruising as set forth in claim 1, wherein for a front wheel drive of utmost importance for passenger cars for land and water cruising for permitting the use of a conventional standard automobile engine (10',10'') with flanged on clutch and change-over transmission with a reverse speed a special additional intermediate transmission (104,104') is integrated into the drive, the input shaft of which may define the direct continuation of the output shaft of the engine change-over transmission or for an additional intermediate transmission (104') arranged further rearwardly in the car may be driven from the change-over transmission via universal joints (73',105'') and an intermediate shaft (74'), in said additional intermediate transmission the input shaft (105) having two dog clutches (107,108) on its central portion provided with longitudinal keys (106), of which clutches the one dog clutch (107), provided with flight pins (109), axially shifted by its operating lever (110), is able to be coupled to a gear (111) loose on the start of the shaft (105), said gear then driving via an intermediate gear (112) meshing therewith and via the shaft (13') thereof and intermediate shafts extending same the differential (12' or 12'') of the car front wheels, whereas on the other hand the other dog clutch (108) with flight pins (113) by an axial shifting by means of its operating lever (114) is able to be coupled to a gear (115) loose on the other end of the shaft (105), said gear then driving via an intermediate gear (116) meshing therewith the shaft (117) thereof which is now able to drive the shaft (81) of the propeller (82) via universal joints and intermediate shafts.

7. A floatable passenger car for land and water cruising as set forth in claim 1, wherein the driving power derived from the automobile engine and driving via special transmissions the car front wheels or the propeller behind the bulkhead (51) of the central portion (2) of the body is transmitted via a universal joint (79) to the propeller shaft (81) which itself is mounted interiorly of a propeller shaft support tube (80) which shortly behind its start behind the universal joint (79) is pivotable upwardly and downwardly in the vertical longitudinal center plane of the car about a horizontal transverse axle (83) in a wide bearing block (84) along with the propeller shaft (81) contained therein, beginning with the bearing block (84), in a narrow elongated acuate shaft chute (85) which, beginning with the bearing block (84), opens downwardly to the water, i.e. apertures the rear gliding floor (44) and also the lower part of the bulkhead (51) in a narrow recess, thereby permitting the propeller shaft support tube (80) along with the propeller shaft (81) and the propeller (82) and also a control rudder (89) assembled behind the propeller at the end of the propeller shaft support tube (80) to be submerged into water, but also permitting an upward pivoting of the propeller shaft support tube (80), the parts connected to the end thereof, in particular the propeller (82) and the control rudder (89) readily being brought into the space kept free directly behind the forwardly positioned bulkhead (51) underneath the floor (52) of the elevated rear body portion (3) in place for land driving.

8. A floatable passenger car for land and water cruising as set forth in claim 7, wherein for an upward and downward pivoting of the propeller shaft support tube (80) along with the propeller (82) and the control rudder (89) about the horizontal axle (83) of the bearing block (84) for road driving in the upper position or for high-speed water glide cruising in the lower position and in each intermediate position a particularly convenient lifting and lowering device to be operated by remote control electrically by the car driver is provided the upper parts of which device are located in a sheet-metal housing (90) which is mounted slightly tiltable with rotary spigots at the two ends in small bearing blocks (91,91') at the upper bulkhead (51), in which horizontally suspended housing (90) at the base plate (92) thereof there are mounted in one ball bearing (93,93') each at the upper end two vertical screw spindles (94,94') suspended downwardly parallel relative to one another which at the top in the sheet-metal housing, coupled by a roller chain (95) connecting same, are able to be driven commonly via a small worm gear (96) by a reversible electric motor (97), one threaded nut (98,98') each of polyamide being positioned on the threads of these two parallel screw spindles at the same level, said nuts carrying at lateral bearing spigots with small bearing blocks (99,99' and 99",99"') a common horizontal transverse rail (100) which itself is connected by means of two lower vertical support rails (101,101') to the top side of a caveation plate (87) above the propeller (82), at which caveation plate the control rudder (89) is rotatably mounted in a bearing (88), the rudder blade (89) thereof being located directly behind the propeller (82) and in curves in water also exerting a substantial lateral thrust upon the propeller shaft support tube (80), for this purpose at the bottom side of the transverse rail (100) thereof in the vicinity of the two outer edges one strong tapered locating pin (102,102') each being provided engaging hookingly upon a downward pivoting of the transverse rail in correspondingly hollow tapered stable bushes (103,103') which are secured to the bottom end of the bulkhead (51), by this additional end connection to the rigid bulkhead also laterally the propeller and the control rudder being given a particularly strong hold even during maximum-speed curve cruising.

9. A floatable passenger car for land and water cruising as set forth in claim 7, wherein the control rudder (89) arranged behind the propeller (82) and liftable and lowerable along with it for water cruising is moved via control cables (120) by means of a steering lever (124) arranged at the internal side of the body adjacent to the driver's seat (4).

10. A floatable passenger car for land and water cruising as set forth in claim 1, comprising a mechanical safety device which during land driving of the car permanently is in safety operation by lock supports (129) then permanently swung with their lower ends into the lifting range of the rear wheel axle trunnions (56) and the lower transverse arms (18) of the car front wheels, said lock supports being mounted suspended generally vertical with their upper ends in a bearing (129') rigid at the body, the lifting of the four car wheels at the body being permitted upwardly only to such an extent that upon engagement with these lock supports the car wheels still have a residual ground clearance still sufficient for a driving of the car, thus thereby a touching of ground by the car floor cannot occur, said limitation supports of the car wheel lift in their lock positions each being urged by a spring (129") against abutment (129"') rigid at the body during the entire land driving process, said car wheel lift limiting supports being laterally swung out only prior to beginning with water high-speed cruising of the car already in water from the locking position thereof by means of a lever (130) operated by the driver via a linkage (130') during that short period of time in which the driver by an operation of the switches (125) with the then operated shifting electric motors (38,61) retracts the car wheels into the body, while otherwise also a hand lever (130) permanently is urged by a spring (130") against an abutment (130"') rigid at the body, said lever abutment additionally being able to be provided with a lock (130"") for a locking action for extended land driving of the car.

11. A floatable passenger car for land and water cruising as set forth in claim 1, wherein for preventing an operation of the shifting electric motors (38,61,50,97) in particular for retracting the car wheels into the body during car land driving by an accidental operation of the switches (125) thereof as electrically acting safety means an intermediate switch (127) is integrated into the power leads (125') from the car accumulator battery (125") to the shifting electric motors, said intermediate switch being interruptable and closable by a float (126,126") or a pressure capsule (128,128"',128") with water supply passage (126',128') preferably through the gliding floor (44), said intermediate switch only upon charging water into the vessels (126,128) thereof, i.e. only when the car is in water, automatically closing the power leads (125'), otherwise said power leads with empty or discharged vessel (126,128), i.e. during a location of the car on land, being permanently kept interrupted by said intermediate switch with automatic float or pressure capsule operation.

* * * * *